UNITED STATES PATENT OFFICE.

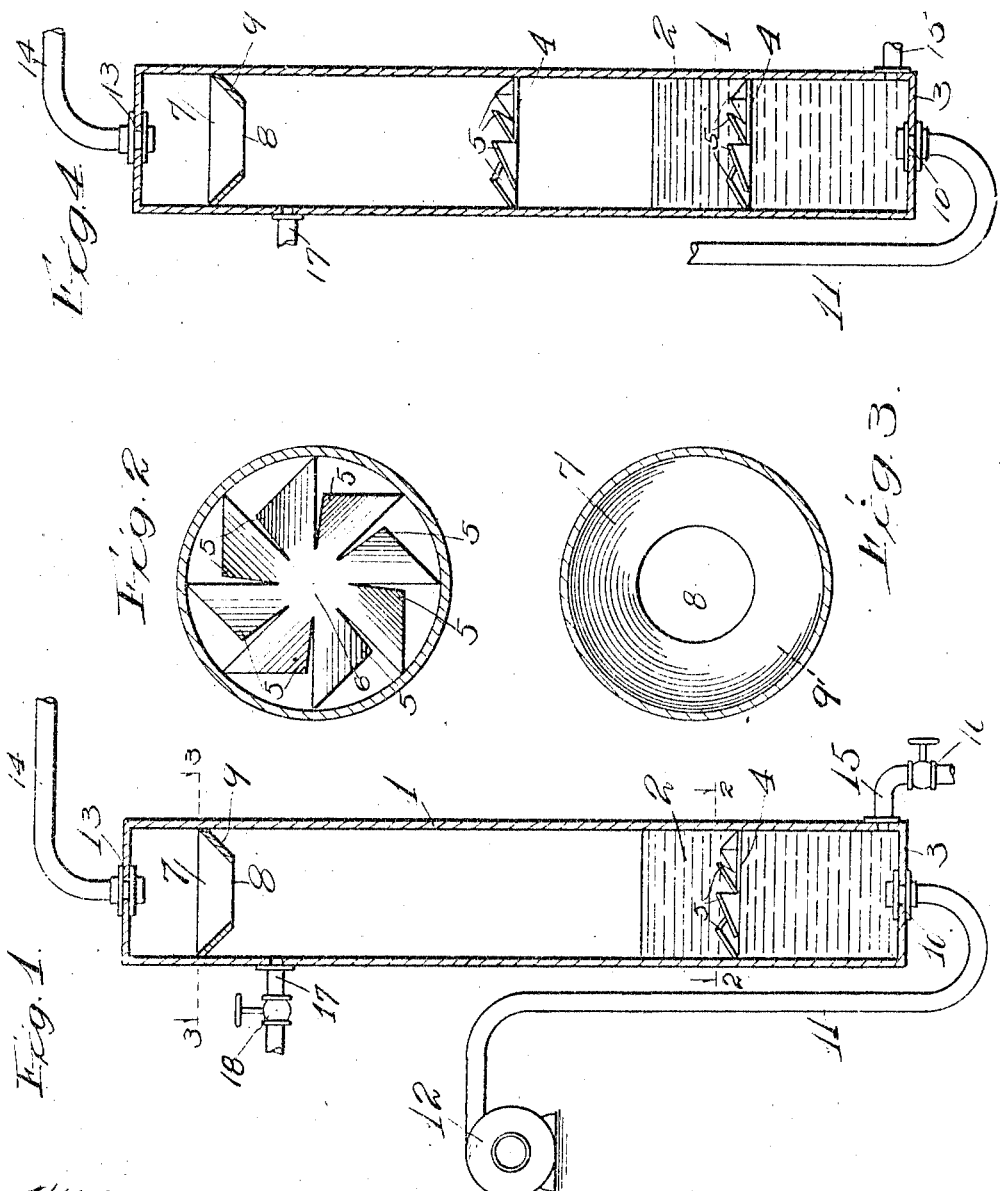

ARTHUR O. FOX AND RUSSELL R. BATES, OF MADISON, WISCONSIN, ASSIGNORS TO GENERAL PURIFICATION COMPANY, OF MADISON, WISCONSIN, A CORPORATION OF ARIZONA.

DEVICE FOR TREATING LIQUIDS.

1,114,874.   Specification of Letters Patent.   Patented Oct. 27, 1914.

Application filed July 9, 1913. Serial No. 778,111.

*To all whom it may concern:*

Be it known that we, ARTHUR O. FOX and RUSSELL R. BATES, citizens of the United States, residing at Madison, in the county of Dane and State of Wisconsin, have invented a certain new and useful Improvement in Devices for Treating Liquids, of which the following is a specification.

This invention relates to devices for treating liquids, and has for its object to provide a new and improved device of this description.

This device may be used to treat any desired liquid by passing a gas therethrough where it is important that the liquid shall not be blown over into some other part of the apparatus.

For purposes of illustration we have shown our invention in connection with an apparatus for treating milk and cream wherein air is forced through a liquid and the resultant gaseous product forced through the milk, cream or other material.

Referring now to the accompanying drawings, Figure 1 is a view in part section showing one form of our device; Fig. 2 is a sectional view taken on line 2—2 of Fig. 1; Fig. 3 is a sectional view taken on line 3—3 of Fig. 1; Fig. 4 is a view showing a modified construction.

Like numerals refer to like parts throughout the several figures.

Referring now to Figs. 1, 2 and 3, we have illustrated a receptacle 1 which is in practice partially filled with the liquid 2. At some point intermediate the bottom 3 of the receptacle and the surface of the liquid therein is a stationary device 4 for causing intimate contact between the gas and the liquid. This device is fastened in position in any desired manner and is provided with a series of inclined faces 5 which extend from the edge toward the center, all of said faces being connected together at the center as shown at 6. The inclined faces may be provided by forming a series of slits in a piece of suitable material extending from the outer edge toward the center and then bending the pieces so as to form the inclined faces. These inclined faces may be formed in any other manner by pieces separated at their edges so as to form openings through which the gas and liquid may pass. These faces are upwardly inclined so that as the air passes up through the liquid it will be divided up and will pass along these inclined faces which are so positioned as to give the liquid a rotary or circulatory motion, being directed toward the walls of the receptacle. Located above the surface of the liquid and fixed in position in any desired manner is an obstructing device 7 which has a central opening 8 and an inclined face 9. This obstructing device is preferably fastened inside of the receptacle in any desired manner. The inclined face of the obstructing device is preferably inclined downwardly and inwardly from the point where the obstructing device is attached to the receptacle, the object being that there shall be an obstructing device which will prevent the passage of liquid which is forced upwardly on or near the inner walls of the receptacle and yet permit air or other gas to freely pass. In the particular construction shown, this obstructing device is illustrated as a hollow inverted frustum of a cone. The receptacle 1 is provided with an inlet 10 which is connected by a suitable pipe or connection 11 with a source of gas supply 12 which in this case is shown as a blower.

In Fig. 4, we have shown the receptacle 1 with one of the devices 4 located beneath the surface of the liquid and another located above the surface of the liquid. The inclined faces of the part 4 may all be inclined in the same direction or some of them may be inclined in one direction and some in a different direction. The receptacle is provided with an outlet 13 to which is connected a pipe 14 which conducts the gas to the point desired. The receptacle may be provided with a suitable pipe 15 and valve 16 at the bottom for drawing off the liquid and a suitable pipe 17 controlled by a valve 18 for inserting the liquid into the receptacle. It is also evident that the form of construction and arrangement of the various parts may be varied in many particulars without departing from the spirit of our invention.

The use and operation of our invention are as follows: When it is desired to treat the liquid by bringing air or other gas in contact with it, such liquid is placed in the receptacle 1 so as to partially fill such receptacle. The air or other gas is then forced into the inlet 10 through the liquid until it strikes the part 4. It is there divided and its direction changed by the inclined faces 5, it being directed toward the walls of the receptacle and given a more or less circulatory movement, carrying the liquid with it. It will thus be seen that the air or other gas is finely divided and the material agitated and brought into intimate contact with such air or other gas. This agitation tends to cause the liquid to be thrown up so that without our device it will escape through the outlet 13 and pass on to another part of the apparatus where it is not wanted. This is particularly true if the pressure with which the air or other gas is forced into the liquid is comparatively high. This liquid follows the inner surface of the receptacle and is either in contact with such surface or near thereto and is caught by the obstructing device 7 and falls back into the main body of liquid. The air or gas passes freely through the opening 8 in the obstructing device and out through the outlet 13 to the point of use. It will be seen that by means of this device, the air or gas is brought into intimate contact with the liquid and yet the liquid is effectually prevented from passing out of the receptacle with the gas to the point where it will produce an injurious effect. It will further be seen that the liquid is agitated and thoroughly mixed with the air without the use of any movable apparatus, the stationary part 4 accomplishing this result.

We claim:—

1. A device for treating liquids comprising a receptacle adapted to contain the liquid, means for forcing gas under pressure into said receptacle, a stationary device in said receptacle extending transversely across the receptacle at a distance from the bottom thereof, said device consisting of a single piece of material having a series of slits extending from the outer edge toward the center thereof, the pieces between the slits bent into inclined positions for dividing the gas and changing its direction.

2. A device for treating liquids comprising a receptacle adapted to contain the liquid, means for forcing gas under pressure into said receptacle, a stationary device in said receptacle above the bottom thereof and below the surface of the liquid, said stationary device consisting of a single piece of material provided with a series of inclined faces radiating from the central portion thereof and separated at their edges to provide openings through which gas and liquid may pass.

3. A device for treating liquids comprising a receptacle adapted to contain the liquid, means for forcing gas under pressure into said receptacle, a stationary device in said receptacle above the bottom thereof and below the surface of the liquid, said stationary device provided with a series of inclined faces separated at their edges to provide openings through which gas and liquid may pass, the portions of the device containing the inclined faces being connected together at the center of the device, said inclined faces positioned to direct the liquid under the pressure exerted by the gas, toward the inner face of the receptacle.

4. A device for treating liquids comprising a receptacle adapted to contain the liquid, means for forcing air under pressure into said receptacle, a stationary device in said receptacle above the bottom thereof and below the surface of the liquid, said stationary device provided with a series of inclined faces separated at their edges to provide openings through which gas and liquid may pass, the portions of the device containing the inclined faces being connected together at the center of the device, said inclined faces positioned to direct the liquid under the pressure exerted by the gas, toward the inner face of the receptacle, and an obstructing device near the top of said receptacle for obstructing passage of the liquid.

5. A device for treating liquids comprising a receptacle adapted to contain the liquid, means for forcing gas under pressure into said receptacle, a stationary device in said receptacle at a distance from the bottom thereof for dividing the gas and changing its direction, and an obstructing device near the top of said receptacle for obstructing the passage of the liquid, said obstructing device having an inclined face projecting from the inner face of the receptacle inwardly and downwardly and provided with a central opening.

6. A device for treating liquids comprising a receptacle adapted to contain the liquid, means for forcing gas under pressure into said receptacle, a stationary device in said receptacle above the bottom thereof and below the surface of the liquid, said stationary device provided with a series of inclined faces separated at their edges to provide openings through which gas and liquid may pass, the portions of the device containing the inclined faces being connected together at the center of the device, said inclined faces positioned to direct the liquid under the pressure exerted by the gas, toward the inner face of the receptacle, an obstructing device near the top of said receptacle comprising a part having an opening therethrough with a downwardly inclined face extending from the outer edge thereof to said opening.

7. A device for treating liquids comprising a receptacle, a gas inlet at the bottom thereof, a stationary device in said receptacle at a distance from the bottom thereof, said stationary device provided with a series of inclined parts separated at their edges so as to provide openings through which the gas and liquid may pass, said inclined parts connected together at their inner ends.

8. A device for treating liquids comprising a receptacle, a gas inlet at the bottom thereof, a stationary device in said receptacle at a distance from the bottom thereof, said stationary device provided with a series of inclined parts separated at their edges so as to provide openings through which the gas and liquid may pass, some of said parts inclined in one direction and others of said parts inclined in a different direction.

9. A device for treating liquids comprising a receptacle, a gas inlet for admitting gas under pressure below the surface of the liquid to be treated, a stationary device in said receptacle between said gas inlet and the surface of the liquid to be treated and consisting of a series of inclined parts separated at their edges to provide openings through which the gas and liquid may pass, a stationary device in said receptacle above the surface of the liquid to be treated and consisting of a series of inclined parts separated at their edges to provide openings.

10. A device for treating liquids comprising a receptacle, a gas inlet for admitting gas under pressure below the surface of the liquid to be treated, a stationary device in said receptacle between said gas inlet and the surface of the liquid to be treated and consisting of a series of inclined parts separated at their edges to provide openings through which the gas and liquid may pass, a stationary device in said receptacle above the surface of the liquid to be treated and consisting of a series of inclined parts separated at their edges to provide openings, and an obstructing device near the top of said receptacle provided with a central opening.

Signed at Chicago, State of Illinois, this 24th day of June, 1913.

ARTHUR O. FOX.
RUSSELL R. BATES.

Witnesses:
DENIE A. WALTERS,
BESSIE S. RICE.